United States Patent [19]

Reinwald et al.

[11] 4,126,574
[45] Nov. 21, 1978

[54] SURFACTANT-CONTAINING ALUMINOSILICATES AND PROCESS

[75] Inventors: Elmar Reinwald, Dusseldorf-Holthausen; Milan J. Schwuger, Haan; Heinz Smolka, Langenfeld, all of Germany

[73] Assignees: Henkel Kommanditgesellschaft auf Aktien, Dusseldorf-Holthausen; Deutsche Gold- und Silber-Scheideanstalt vormals Roessler, Frankfurt am Main, both of Germany

[21] Appl. No.: 811,964

[22] Filed: Jun. 30, 1977

Related U.S. Application Data

[63] Continuation-in-part of Ser. No. 763,667, Jan. 28, 1977, abandoned, which is a continuation of Ser. No. 503,467, Sep. 5, 1974, abandoned.

[30] Foreign Application Priority Data

Sep. 7, 1973 [AT] Austria ................................ 7771/73
Oct. 1, 1973 [AT] Austria ................................ 8382/73
Dec. 3, 1973 [AT] Austria ................................ 10098/73

[51] Int. Cl.$^2$ ..................... C01B 33/28; C02B 1/44; C11D 1/38; C11D 3/12
[52] U.S. Cl. ........................... 252/179; 210/38 A; 210/41; 252/89 R; 252/140; 252/155; 252/173; 252/313 R; 252/357; 252/547; 423/265; 423/328; 423/329
[58] Field of Search ................. 252/89, 131, 135, 140, 252/179, 173, 313 R, 357, 547, 155; 8/137; 423/328, 329, 265; 210/38 A, 41

[56] References Cited

U.S. PATENT DOCUMENTS

| 3,206,408 | 9/1965 | Vitalis | 252/557 |
| 3,254,034 | 5/1966 | Dwyer | 252/430 |
| 3,313,594 | 4/1967 | Wilson | 423/329 |
| 3,708,428 | 1/1973 | McDonald | 252/109 |
| 3,886,079 | 5/1975 | Burke | 252/109 |
| 3,925,262 | 12/1975 | Laughlin | 252/526 |
| 3,929,678 | 12/1975 | Laughlin | 252/526 |
| 4,071,377 | 1/1978 | Schwuger | 252/179 X |

FOREIGN PATENT DOCUMENTS 2,422,655  4/1974  Fed. Rep. of Germany ........... 252/131

OTHER PUBLICATIONS

McCutcheon's Detergents & Emulsifiers – 1970 Annual, pp. 45, 62 & 109.

Primary Examiner—Dennis L. Albrecht
Attorney, Agent, or Firm—Hammond & Littell

[57] ABSTRACT

This invention relates to cation-exchanging, water-insoluble aluminosilicates containing bound water and an ionic surface-active compound resistant to water hardness formers and having, for every mol of $Al_2O_3$, from 0.7 to 1.5 mols $Cat_{2/n}O$, where Cat is a cation having the valence $n$, and from 0.8 to 6 mols $SiO_2$, and being produced by the precipitation of said aluminosilicate in an aqueous solution, wherein said reaction is conducted in the presence of an aqueous solution of said ionic surface-active compound, and optional subsequent crystallization; as well as a process for its preparation and a process for the sequestration of water hardness cations employing said aluminosilicates.

14 Claims, No Drawings

SURFACTANT-CONTAINING ALUMINOSILICATES AND PROCESS

REFERENCE TO PRIOR APPLICATIONS

This application is a continuation in part of our co-pending U.S. patent application Ser. No. 763,667, filed Jan. 28, 1977, now abandoned, which application in turn is a continuation of Ser. No. 503,467, filed Sept. 5, 1974, now abandoned.

BACKGROUND OF THE INVENTION

Aluminosilicates containing cations capable of exchanging which possess the capacity of sequestering ions causing water hardness are known. Such substances can be easily obtained, for example, by reaction of water-soluble silicates with water-soluble aluminates in the presence of water.

For this purpose, aqueous solutions of the starting materials can be mixed with each other or when one component is present as solid, it can be caused to react with the other which is present as an aqueous solution. When both components are in the solid state, they can be mixed in the presence of water to obtain the desired aluminosilicates. Such aluminosilicates can also be prepared by causing $Al(OH)_3$ or $Al_2O_3$ to react with alkali metal silicate solutions. Process for the preparation of these aluminosilicates are described, for example, in copending U.S. patent application Ser. No. 458,306, filed Apr. 5, 1974, now abandoned.

OBJECTS OF THE INVENTION

An object of the present invention is the obtaining of cation-exchanging, water-insoluble aluminosilicates containing an ionic surface-active compound resistant to water hardness formers, having an increased cation exchange capacity and improved stability in aqueous suspensions.

Another object of the present invention is the development of cation-exchanging, water-insoluble aluminosilicates containing bound water and an ionic surface-active compound active in the presence of water hardness formers and having for every mol of $Al_2O_3$, from 0.7 to 1.5 mols of $Cat_{2/n}O$, where Cat is a cation having the valence $n$, and from 0.8 to 6 mols of $SiO_2$, and being produced by the precipitation of said aluminosilicate in an aqueous solution, wherein said reaction is conducted in the presence of an aqueous solution of said ionic surface-active compound, and optional subsequent crystallization.

A further object of the present invention is the development of processes for preparing the above aluminosilicates.

A still further object of the present invention is the improvement in the process of sequestering water hardness cations by adding a sequestering agent to hard water, the improvement consists of employing the above aluminosilicates as said sequestering agent.

These and other objects of the invention will become more apparent as the description thereof proceeds.

DESCRIPTION OF THE INVENTION

The invention concerns new cation-exchanging aluminosilicates which are capable of sequestering calcium ions and which contain bound water. These aluminosilicates are characterized by a content of ionic surface-active compounds that are active in the presence of water hardness formers or resistant to the action of water hardness formers. These ionic surface-active compounds may be called "surfactants" or "tensides" hereafter for simplification.

The invention, therefore, relates to cation-exchanging, water-insoluble aluminosilicates containing bound water and an ionic surface-active compound active in the presence of water hardness formers and having for every mol of $Cat_{2/n}O$, where Cat is a cation having the valence $n$, and from 0.8 to 6 mols of $SiO_2$, being produced by the precipitation of said aluminosilicate in an aqueous solution, wherein said reaction is conducted in the presence of an aqueous solution of said ionic surface-active compound, and optional subsequent crystallization.

The content of surfactants in the new compounds preferably lies in the range of 0.01% to 50%, especially 0.1% to 35%, by weight of surfactant, based on the mixture of surfactant and anhydours inorganic active substance (= AS). As for the remainder, the new compounds contain, per mol $Al_2O_3$, preferably from 0.7 to 1.5, especially 0.9 to 1.3, mol of $Cat_{2/n}O$, where Cat represents a cation having the valence $n$, and from 0.8 to 6, especially from 1.3 to 4.0, mols of $SiO_2$. These aluminosilicates contain bound water. The amount of bound water will vary. However, when the aluminosilicates are dried for 3 hours at 80° C., under a pressure of 100 mm of Hg, the amount of bound water per mol $Al_2O_3$ varies from 3 to 10, especially 3.5 to 7.5, mols of $H_2O$. The calcium sequestering power of these compounds preferably lies in the range of from 50 to 200, especially from 80 to 160 mg CaO/gm AS.

The preferred cation is sodium. However, sodium can be replaced with lithium, potassium, ammonium, or magnesium, as well as with the cations of water-soluble organic bases, for example, those of primary, secondary or tertiary alkylamines or alkylolamines having at the most, two carbon atoms per alkyl group, or at the most, three carbon atoms per alkylol group. Preferably, the cation is selected from the group consisting of sodium, potassium and lithium.

The new compounds are designated as "aluminosilicates" to simplify the following discussion. The preferentially used compounds are the sodium aluminosilicates. All data concerning their properties, their preparation, and their application are logically valid for the other claimed compounds.

The new compounds differ from the known ones by an increased cation exchange capacity. In addition, aqueous suspensions of the compounds are more stable than those of the corresponding aluminosilicates that do not contain any surfactants. Because of this property, the compounds may be employed in the textile washing process where the formation of sediments on the washed textiles is to be avoided. The new compounds also differ from aluminosilicates which, after preparation and drying, are treated with an aqueous solution of an ionic surface-active compound and dried, in that better wash results and a faster release of ionic surface-active compounds are obtained.

In addition, the invention concerns a process for the manufacture of the new compounds by the reaction of water-soluble aluminates with water-soluble silicates in the presence of water. The process is characterized in that it is conducted in the presence of anionic, cationic, or zwitterionic surface-active compounds active in the presence of water hardness formers, optionally followed by crystallization.

More particularly, therefore, the process of the invention relates to the process for the preparation of aluminosilicates by reacting water-soluble aluminates with water-soluble silicates in the presence of water and recovering water-insoluble aluminosilicates, the improvement consisting of conducting said reaction in the presence of an aqueous solution of an ionic surface-active compound active in the presence of water hardness formers, and optionally subsequent crystallizing.

A preferred process for the manufacture of the new aluminosilicates is their precipitation by mixing aqueous aluminate and silicate solutions where the surfactants are present during the precipitation. It has proven advantageous to start with the surfactant-containing silicate solution and then to admix the aluminate solution.

The formation of the water-insoluble aluminosilicates in the presence of the above-cited surfactants makes it possible to slow down or prevent the crystallization of the aluminosilicates which are first precipitated in an X-ray amorphous state, depending on the surfactant concentration, and thus to keep the particle size of the aluminosilicates very small. This particle size lies mostly below 30 $\mu$ whereby the maximum of the distribution curve of the particle size is considerably lower, for example, in the range of 3 to 8 $\mu$, but can also decrease to the range of true colloids. Hence, the suspensions of these X-ray amorphous products obtained during the precipitation are more stable than the suspensions prepared in the absence of surfactants.

The concentration of the suspensions according to the invention preferably lies in the range of from 2% to 50%, especially from 5% to 35%, by weight of surfactant-containing aluminosilicate. The above concentration data refer to the product which has been dried at 80° C. for three hours under a pressure of 100 mm Hg. This product, however, still contains some bound water as indicated above.

If so desired, the aluminosilicate suspensions thus prepared can be concentrated by removal of part of the mother liquor. For many purposes of application, the substitution of water for the mother liquor is advantageous. Finally, the new aluminosilicates can be totally free from the mother liquor and converted to dry powders by drying at temperatures of from 20° C. to 150° C. After the precipitated products have thus been dried, they still contain bound water in the order of 3 to 10 mols per mol $Al_2O_3$. This can be completely removed only by heating to 800° C. for one hour, whereby, of couse, the organic components are totally destroyed. The products thus treated are here designated as "anhydrous inorganic active substances" (AS). The values quoted within the framework of the Examples for the calcium sequestering power are calculated on the basis of this anhydrous active substance as mg CaO/gm AS.

During the precipitation, the surfactants are incorporated into the X-ray amorphous aluminosilicate being formed and are more or less slowly released, depending upon the nature of the surfactant, when these aluminosilicates are introduced into water free from surfactants. Therefore, it is advantageous that for the purification of the precipitated crude products, aqueous solutions of the incorporated surfactant are utilized for washing out the mother liquor.

"Ionic" surfactants resistant to the action of water hardness formers" within the meaning of the invention are anionic, cationic, or zwitterionic water-soluble organic surface-active compounds which even when used in small concentrations and in the presence of soluble salts causing hardness, appreciably reduce the surface tension and which in their molecule contain an aliphatic hydrocarbon residue having 8 to 26, preferably 10 to 22, especially 10 to 18, carbon atoms, or an alkylaromatic residue having 6 to 18, preferably 8 to 16 aliphatic carbon atoms, and an anionic and/or cationic group imparting solubility in water.

Zwitterionic surfactants are surfactants having molecules which contain anionic and cationic groups simultaneously. Preferably, the cationic surface-active compounds are employed in the aluminosilicates of the invention. With the cationic surfactants, a controlled release into solution is obtained with improved wash results.

The anionic surfactants comprise those of the sulfonate, sulfate, phosphonate, and phosphate types. In addition, compounds that are resistant to the action of water hardness formers are also to be found among the synthetic surfactants of the carboxylate type.

Surfactants of the sulfonate type which are useful in the production of the products of the invention are alkylbenzenesulfonates ($C_{9-15}$ alkyls) or mixtures of alkenesulfonates and hydroxyalkanesulfonates, as well as alkanedisulfonates, which are prepared, for example, by sulfonating monoolefins having terminal or non-terminal double bonds using gaseous sulfur trioxide, followed by alkaline or acidic hydrolysis of the sulfonation products. Other suitable alkanesulfonates are the ones obtainable by the sulfochlorination or sulfoxidation of alkanes, followed by hydrolysis or neutralization, or are obtainable by the addition of alkali metal bisulfites to olefins. Additional usable surfactants of the sulfonate type are the esters of $\alpha$-sulfo-fatty acids, for example, the $\alpha$-sulfo acids derived from hydrogenated methyl or ethyl esters of the fatty acids derived from coconut oil, palm-kernel oil, or tallow.

Further suitable surfactants of the sulfonate type are the fatty acid esters or amides of lower hydroxyalkanesulfonic acids or amino-alkanesulfonic acids. Also usable are the esters of higher fatty alcohols with lower sulfocarboxylic acids, such as, for example, sulfoacetic acid, sulfosuccinic acid, sulfobenzoic acid, sulfosalicylic acid, and sulfophthalic acid.

Suitable surfactants of the sulfate type are the monoesters of sulfuric acid with primary higher fatty alcohols (for example, oleyl alcohol or primary alcohols derived from coconut oil or tallow) or the monoesters of sulfuric acid with secondary alkanols having 8 to 26 carbon atoms and mono- and diesters of sulfuric acid with terminal or internal higher alkanediols. Likewise suitable are sulfated higher fatty acid monoglycerides. Other suitable surfactants of the sulfate type which may be utilized are sulfated nonionics. In this case the expression "non-ionics" designates products obtained by the addition of 1 to 40, preferably 4 to 20, mols of ethylene oxide and/or propylene oxide to 1 mol of higher fatty alcohol, higher alkylphenol, higher fatty acid, higher fatty amide, or higher alkylbenzenesulfonamides or higher alkanesulfonamides. Especially important are the sulfated adducts of 2 to 8 mols of ethylene oxide with fatty alcohols derived from coconut oil or tallow, or with oleyl alcohol, or with secondary alcohols having 8 to 18, preferably 12 to 14, carbon atoms, or with mono- or dialkylphenols, having alkyl groups containing 6 to 14 carbon atoms.

The surfactants of the synthetic carboxylate type are also substances resistant to water hardness formers, especially those compounds, the molecules of which contain one or more carboxymethyl ether groups. Examples of the same are the carboxymethyl ethers of the above-enumerated nonionics, especially the ethoxylated higher fatty alcohols, (3 to 8 ethylene glycol ether groups per molecule). Additional examples are carboxymethyl ethers of terminal or non-terminal higher alkanadiols, higher fatty alcohol glycerol ethers or higher fatty alcohol pentaerythritol ethers.

All these anionic surfactants are used as salts whereby the cations present can be the one previously enumerated for the "Cat" in the aluminosilicates.

Just as in the anionic surfactants, the cationic surfactants to be used according to the invention contain a straight-chain or branched-chain aliphatic or cycloaliphatic hydrocarbon residue having 8 to 26, preferably 10 to 22, especially 12 to 18 carbon atoms or an alkylaromatic or cycloalkylaromatic hydrocarbon residue having 6 to 18, preferably 8 to 16, aliphatic carbon atoms. The preferred basic groups are basic nitrogen atoms. Accordingly, eligible cationic surface-active compounds can be aliphatic, cycloaliphatic, alkyl or cycloalkylaromatic amines of primary, secondary, or tertiary character, guanidine, or biguanidine derivatives, compounds containing heterocyclic nitrogen atoms, such as, for example, derivatives of morpholine, pyridine, imidazoline, piperidine, etc. Preferred are quaternary ammonium bases.

The hydrophobic residue and the group imparting water-solubility can be directly linked to each other or linked via hetero atoms or via hetero atom groups as, for example, by ether or thioether atoms, aminonitrogen atoms, carboxylic ester groups, carboxylic acid amide groups or sulfonic acid amide groups, etc.

In addition to the hydrophobic residue or residues, the cationic surfactants, especially the secondary, tertiary, or quaternary ammonium bases, also contain groups linked to the basic nitrogen, such as lower alkyl groups having 1 to 4 carbon atoms, alkylol groups having 2 to 4 carbon atoms or aromatic hydrocarbon residues, as for example, phenyl or benzyl groups.

As examples for cationic surface-active compounds or tensides to be used according to the invention, the following may be employed:

N-dodecyl-N',N',N'-trimethyl-1,3-diaminopropane,
octyl- or dodecyltrimethylammonium bisulfate,
hexadecyl- or octadecyltrimethylammonium methosulfate,
bis ($C_{12-18}$-alkyl)-dimethylammonium chloride,
dibutylallyldodecylammonium chloride, or
ethylallylcyclohexyldodecyl ammonium chloride,
ethylcrotyl-(diethylaminoethyl)-dodecylammonium chloride,
the orthophosphate of a quaternary base obtained by the reaction of one mol of a fatty amine derived from tallow with 10 mols of ethylene oxide,
($C_{10-16}$-alkyl)-benzyldimethylammonium chloride,
($C_{10-16}$-alkyl)-(dichlorobenzyl)-dimethylammonium bromide,
dimethyl-dodecyl-($\beta$-phenoxyethyl)-ammonium bromide,
($C_{9-15}$-alkyltoluyl)-trimethylammonium chloride,
benzyl-dimethyl-(p-octylphenoxyethoxyethyl)-ammonium chloride,
($C_{10-16}$-alkyl)-dimethyl-(napthomethyl)-ammonium chloride,
dimethyl-(o-dimethylbenzyl)-dodecylammonium bromide,
($C_{9-15}$-alkylphenyl)-trimethylammonium chloride;

in addition, organic bases or their salts in which the hydrophobic residues contain hetero atoms or hetero groups as, for example:
(octadecoxycarbomethyl)-trimethylammonium chloride,
(dodecoxycarbomethyl)-pyridinium methosulfate,
(naphthenoxycarbomethyl)-quinolinium chloride,
(abietyloxycarbomethyl)-quinolinium bromide,
di-(dodecoxycarbomethyl)-dimethylammonium methosulfate,
(octadecylaminocarbomethyl)-trimethylammonium chloride,
(octadecylanilinocarbomethyl)-pyridinium bisulfate,
(dodecoxymethyl)-trimethylammonium chloride,
(octadecylthiomethyl)-triethylammonium bisulfate,
(octadecylcarbaminomethyl)-pyridinium chloride,
(octadecyloxycarbaminomethyl)-pyridinium methosulfate.

The above organic nitrogen bases can be replaced with correspondingly constituted compounds containing quaternary phosphorus, arsenic or other quaternary atoms, or with compounds containing a ternary sulfur atom.

It is to be understood that in the present case, cationic surfactants also include compounds having secondary or tertiary nitrogen atoms which contain alkylol groups linked to the nitrogen atom, as for example, ethoxylation products of long-chain primary or secondary amines or reaction products of one mol of fatty acid or fatty acid ester with at least two mols of a dialkylolamine, for example, diethanolamine.

Eash molecule of the zwitterionic surface-active compounds to be used according to the invention contains at least one of the above-cited anionic groups and one of the above-cited cationic groups. However, several anionic and/or cationic groups can be present. Preferably, equal numbers of anionic and cationic groups are present in one molecule.

The hydrophobic residue and the anionic or cationic group can be linked to each other directly or via hetero atoms or hetero groups, as for example, via ether or thioether atoms, aminonitrogen atoms, carboxylic acid ester groups, carboxylic acid amide groups, or sulfonic acid amide groups, etc.

In addition to the hydrophobic residue or residues contained in the cationic groups, other groups are also linked to the basic nitrogen, phosphorus, sulfur, or oxygen, such as lower alkyl groups having 1 to 4 carbon atoms, alkylol groups having 2 to 4 carbon atoms, or aromatic hydrocarbon residues, as for example, phenyl or benzyl groups.

Suitable compounds of this class are, for example, betaines, sulfatebetaines, sulfobetaines and in cases in which a small phosphorus content is not disturbing, also phosphate-betaines. They can be represented by the following formulae:

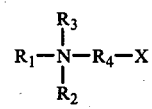

I)

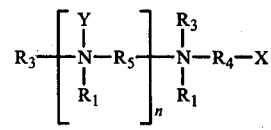

II)

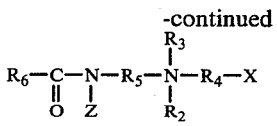
                                III)

In these formulae:

$R_1$ is an aliphatic, cycloaliphatic, or alkylaromatic group having 10 to 22 carbon atoms, preferably a straight-chain alkyl group having 12 to 22 carbon atoms, $R_2$ is an alkyl group having 1 to 4 carbon atoms, or an alkylol group having 2 to 4 carbon atoms, or a polyether residue having the formula

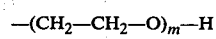

in which $m = 2$ to 5, $R_3$ is the group $R_2$ or a phenyl, benzyl or toluyl group, $R_4$ is an alkylene group or a hydroxyalkylene group having 2 to 4 carbon atoms, $R_5$ is an alkylene group having 2 to 4 carbon atoms, $R_6$ is a saturated or ethylenically-unsaturated, preferably straight-chain hydrocarbon residue having 9 to 21, especially 11 to 17 carbon atoms, X are the groups $-COO^-$, $-O-SO_3^-$, or $-SO_3^-$, Y are the groups H or X, Z are the groups H or $R_2$, and $n$ is an integer from 1 to 100.

Betaines having the formula I are prepared by causing tertiary amines of the formula $R_1R_2R_3N$ to react with halocarboxylic acids, for example, chloroacetic acid, bromoacetic acid, or α-chloropropionic acid, or by quaternizing in suitable manner aminocarboxylic acids or the product of the reaction of secondary amines with acrylic acid. Sulfate-betaines are analogously obtainable by the reaction of the tertiary amines with the esters or salts of haloalkylsulfuric acids. Sulfobetaines are obtainable by the reaction of the tertiary amines with haloalkylsulfonic acids or sultones, especially with propanesultone.

Formula II includes examples for compounds having several betaine, sulfate-betaine, or sulfobetaine groups. To prepare these compounds, polyethyleneimine, polypropylenimine, or polybutylenimine are alkylated, and then reacted in the above-mentioned manner with halocarboxylic acids, haloalkylsulfuric acid esters, haloalkylsulfonic acids or sultones. Alternatively, the polyetheleimines can be first caused to react with acrylic acid derivatives and then be alkylated by introduction of the group $R_1$. Compounds of the formula III can be obtained when natural or synthetic fatty acids are condensed with ethylenediamine, N-alkylethylenediamine or N-hydroxyalkylethylenediamine, followed by reaction with halocarboxylic acids, haloalkylsulfuric acid esters or haloalkylsulfonic acids or sultones. In addition to the above methods of preparation, other methods can be used, for example, the reaction of tertiary amines with epichlorohydrin, followed by the introduction of sulfate or sulfonate groups.

Examples of these zwitterionic surface-active compounds are:

N-alkyl-N-dimethyl-ammonium-methyl carboxylate,

N-alkyl-N-benzyl-N-methylammonium-methyl carboxylate,

N-alkyl-N-bis-(2-hydroxyethyl)-ammonium-methyl carboxylate,

N-alkyl-N-diethylammonium-ethyl carboxylate, 2-alkyl-1-(2-hydroxyethyl)-imidazolinium-1-methyl carboxylate, 3-(N-alkyl-N-dimethylammonium)-2-hydroxypropyl-sulfate, 3-(N-alkyl-N-dimethylammonium)-propane-sulfonate, and 1-(3-trimethylammonium)-alkane-sulfonate, in which the alkyl or the alkane groups preferably are long-chain hydrocarbon residues having 10 to 22, preferably 12 to 18, carbon atoms and can be, for example, derived from natural fatty residues, such as are obtainable from coconut oil or tallow.

In the new compounds, the surfactants can be bound to the surface of the aluminosilicate particles, but they can be also embedded in the aluminosilicates. Preferably, they are adsorbed on the surface as well as embedded in the aluminosilicates.

Surfactants having bulky hydrophobic residues (for example, such as with branched chains or ring systems) have been shown to be more solidly anchored in the new compounds than those having straight-chain aliphatic residues. The latter surfactants are easier dissolved out from the aluminosilicate than the former when the new compounds or their suspensions are introduced into water.

Of special interest are the new compounds which have been prepared from cationic or zwitterionic surfactants which likewise can be bound to the surface of the aluminosilicates. They can be also embedded in the aluminosilicates. In most cases, especially the cationic surfactants are not only adsorbed on the surface (i.e., they form a part of the previously mentioned cation "Cat" when the composition of the aluminosilicates was discussed), but they are also embedded in the aluminosilicates.

In aqueous solution, the new surfactant-containing aluminosilicate substances release the bound surfactants. Therefore, the types charged with anionic or zwitterionic surfactants are suitable as additives to washing and cleaning liquors. The aluminosilicates charged with cationic surfactants are distinguished by a remarkable adsorption power for dissolved dyestuffs or dispersed pigments, hence can be used as adsorptive agents for such substances. In case the cationic surfactants have antimicrobial properties, the new compounds can be used wherever a gradual release of the cationic surfactants to the surrounding liquid is desired.

The following examples are illustrative of the practice of the invention without being limitative of the same in any respect.

EXAMPLES

The surfactant-containing aluminosilicates of the invention are manufactured according to the following directions unless another method of operation is expressly stated.

A solution of the surface-active compound (surfactant) and an alkali metal silicate in deionized water was introduced into a one-liter vessel and while mixing with a high-speed intensive stirrer (10,000 rpm, "Ultraturrax", made by Janke & Kunkel IKA-Werk, Stauffen-/Breisgau, Germany), the aluminate solution was then added in small portions. Immediately before use, the solution of $Na_2O \cdot 8\ SiO_2$ had been prepared from finely divided, easily alkaline-soluble silicic acid and commercial water glass. After stirring had been continued for 30 minutes, an aliquot part of the aluminosilicate suspension which had been formed was separated for isolating the aluminosilicate. For this purpose, the solution was filtered with suction from the solid which had been formed, and the residue on the filter was washed with deionized water. The residue on the filter was dried at 80° C. for three hours under 100 mm Hg pressure and then analyzed. The yields of the products thus dried amounted to 70% to 95% of the theoretical.

The water content was determined with Fischer's reagent and for the determination of the amount of the anionic or cationic surfactants, 0.5 gm of the new product were dissolved in 50 ml of 1N $H_2SO_4$ at boiling, followed by titration of the surfactant according to Reid et al, "Tenside", Vol. 4 (1967), pp. 292-304. For the determination of the zwitterionic surfactants, the DGF Standard Method H III 4 (65) was employed. (DGF-Einheitsmethoden, Stuttgart, 1969 — DGF = Deutsche Gesellschaft fur Fettwissenschaften, German Society for the Science of Fats.)

All data given in % are percent by weight. The contents of surfactants are based on the precipitation product which has been dried in the above-described manner and still contains bound water. If these contents were to be computed on the basis of the mixture of surfactant and anhydrous inorganic active substance, somewhat higher values would be obtained.

Comparative substances were prepared under the same conditions, except that surfactants were omitted from the starting solutions. These compounds and the compounds of the invention were compared in the determination of the Ca-sequestering power according to the following method:

One gram of the product dried in the above-described manner (on an AS basis) was stirred at 50° C. for 15 minutes with one liter of a solution of 0.7865 gm of $CaCl_2 \cdot 2 H_2O$/liter (equal to 30° dH — German hardness) which had been adjusted to a pH of 10. After the aluminum silicate had been filtered off, the residual hardness "x" of the filtrate was determined from which the Ca-sequestering power was computed in mg CaO/gm AS according to the formula: (30-x) · 10. For short hand purposes the above procedure is hereinafter referred to by the Calcium Binding Power Test Method.

The surfactants which were used, the anionic surface-active compounds or anionic surfactants being present as Na-salts, were designated by the following abbreviations:

"ABS" designates the salt of an alkylbenzenesulfonic acid having 10 to 15, preferably 11 to 13, carbon atoms in the alkyl chain, which acid had been prepared by the condensation of straight-chain olefins with benzene, followed by sulfonation of the alkylbenzene thus formed.

"TPS" designates the salt of an alkylbenzenesulfonic acid having 9 to 15, preferably 12, carbon atoms in the alkyl chain, which acid had been prepared by the condensation of technical tetrapropylene with benzene, followed by sulfonation of the alkylbenzene thus formed.

"MS" designates the salt of a mixture of alkanemonosulfonates and alkanedisulfonates ("Mersolat"), which mixture has been prepared by sulfochlorination of a $C_{12-18}$-paraffin, saponification of the sulfochloride thus formed with aqueous sodium hydroxide and separation of the non-converted paraffin mixture from the sulfonate.

"FAS" designates the sulfate of dodecyl alcohol.

"FA-EO-S" designates the sulfate of an adduct of two mols of ethylene oxide with one mol of a fatty alcohol derived from coconut oil.

"OS" designates a sulfonate that has been prepared from α-olefin mixtures having 15 to 18 carbon atoms by sulfonation with $SO_3$ and hydrolysis of the sulfonation product with aqueous sodium hydroxide, which sulfonate essentially consists of alkenesulfonate and hydroxyalkanesulfonate and which, in addition, contains small quantities of alkanedisulfonates.

"FA-EO-CME" designates the carboxymethyl ether of an adduct of 4.5 mols of ethylene oxide with one mol of a fatty alcohol derived from coconut oil.

"CTMA" = cetyltrimethylammonium chloride
"CTMB" = cetyltrimethylammonium bromide
"LTMA" = lauryltrimethylammonium chloride
"LYPC" = laurylpyridinium chloride
"LBDM" = laurylbenzyldimethylammonium chloride
"LDBD" = lauryl(dichlorobenzyl)dimethylammonium chloride
"TDMA" = di-(palmityl/stearyl)-dimethylammonium chloride, where the palmityl/stearyl alkyl mixture is derived from tallow fatty acids.

EXAMPLE A1

| | |
|---|---|
| Precipitation: | 0.5 gm of ABS in the form of a 20% technical solution and 90.4 gm of a 25% aqueous solution of $Na_2O \cdot 8 SiO_2$ dissolved in 300 ml of deionized water were precipitated with a solution of 27.4 gm of sodium aluminate (41% $Na_2O$; 54% $Al_2O_3$) in 80 ml of water. |
| Composition of the dried precipitation product: | $1.3 Na_2O \cdot Al_2O_3 \cdot 2.9 SiO_2 \cdot 5.1 H_2O$, 0.9% ABS. |
| Concentration of the suspension: | 9.1% solids having the above composition. |
| Ca-sequestering power: | 110 mg CaO/gm AS. |

EXAMPLE A2

| | |
|---|---|
| Precipitation: | As in Example A1, except that 1.0 gm of ABS was used. |
| Composition of the dried precipitation product: | $1.2 Na_2O \cdot Al_2O_3 \cdot 2.8 SiO_2 \cdot 6.4 H_2O$, 1.5% ABS. |
| Concentration of the suspension: | 9.5% solids having the above composition. |
| Ca-sequestering power: | 109 mg CaO/gm AS. |

EXAMPLE A3

| | |
|---|---|
| Precipitation: | As in Example A1, except that 2.5 gm of ABS were used. |
| Composition of the dried precipitation product: | $1.2 Na_2O \cdot Al_2O_3 \cdot 2.9 SiO_2 \cdot 4.8 H_2O$, 3.5% ABS. |
| Concentration of the suspension: | 9.3% solids having the above composition. |
| Ca-sequestering power: | 114 mg CaO/gm AS. |

EXAMPLE A4

| | |
|---|---|
| Precipitation: | As in Example A1, except that 5 gm of ABS were used. |
| Composition of the dried precipitation product: | $1.2 Na_2O \cdot Al_2O_3 \cdot 2.9 SiO_2 \cdot 4.2 H_2O$, 6.3% ABS |
| Concentration of | |

-continued

| | |
|---|---|
| the suspension: | 9.4% solids having the above composition. |
| Ca-sequestering power: | 107 mg CaO/gm AS. |

EXAMPLE A5

| | |
|---|---|
| Precipitation: | As in Example A1, except that 10 gm of ABS were used. |
| Composition of the dried precipitation product: | 1.2 $Na_2O$ . $Al_2O_3$ . 3.2 $SiO_2$ . 6.3 $H_2O$, 11.5% ABS. |
| Concentration of the suspension: | 10.2% solids having the above composition. |
| Ca-sequestering power: | 110 mg CaO/gm AS. |

EXAMPLE A6

| | |
|---|---|
| Precipitation: | As in Example A1, except that 50 gm of ABS were used. |
| Composition of the dried precipitation product: | 1.3 $Na_2O$ . $Al_2O_3$ . 2.7 $SiO_2$ . 3.9 $H_2O$, 33.4% ABS. |
| Concentration of the suspension: | 11.7% solids having the above composition. |
| Ca-sequestering power: | 105 mg CaO/gm AS. |

EXAMPLE A7

| | |
|---|---|
| Precipitation: | As in Example A1, except that 1 gm of TPS was used in the form of a solution containing 20 gm/liter. |
| Composition of the dried precipitation product: | 1.2 $Na_2O$ . $Al_2O_3$ . 2.8 $SiO_2$ . 6.4 $H_2O$, 1.7% TPS. |
| Concentration of the suspension: | 9.5% solids having the above composition. |
| Ca-sequestering power: | 108 mg CaO/gm AS. |

EXAMPLE A8

| | |
|---|---|
| Precipitation: | As in Example A1, except that 1 gm of MS was used in the form of a solution containing 20 gm/liter. |
| Composition of the dried precipitation product: | 1.1 $Na_2O$ . $Al_2O_3$ . 2.7 $SiO_2$ . 4.1 $H_2O$, 0.1% MS. |
| Concentration of the suspension: | 8.9% solids having the above composition. |
| Ca-sequestering power: | 104 mg CaO/gm AS. |

EXAMPLE A9

| | |
|---|---|
| Precipitation: | As in Example A1, except that 1 gm of FAS was used in the form of a solution containing 20 gm/liter. |
| Composition of the dried precipitation product: | 1.2 $Na_2O$ . $Al_2O_3$ . 2.9 $SiO_2$ . 6.4 $H_2O$, 0.1% FAS. |
| Concentration of the suspension: | 9.3% solids having the above composition. |
| Ca-sequestering power: | 111 mg CaO/gm AS. |

EXAMPLE A10

| | |
|---|---|
| Precipitation: | As in Example A1, except that 1 gm of FA-ED-S was used in the form of a solution containing 20 gm/liter. |
| Composition of the dried precipitation product: | 1.2 $Na_2O$ . $Al_2O_3$ . 2.9 $SiO_2$ . 6.1 $H_2O$, 0.1% FA-EO-S. |
| Concentration of the suspension: | 9.3% solids having the above composition. |
| Ca-sequestering power: | 120 mg CaO/gm AS. |

EXAMPLE A11

| | |
|---|---|
| Precipitation: | As in Example A1, except that 1 gm of OS was used in the form of a solution containing 10 gm/liter. |
| Composition of the dried precipitation product: | 1.2 $Na_2O$ . $Al_2O_3$ . 2.8 $SiO_2$ . 6.7 $H_2O$, 0.1% OS. |
| Concentration of the suspension: | 9.4% solids having the above composition. |
| Ca-sequestering power: | 108 mg CaO/gm AS. |

EXAMPLE A12

| | |
|---|---|
| Precipitation: | As in Example A1, except that 1 gm of FA-EO-CME was used. |
| Composition of the dried precipitation product: | 1.2 $Na_2O$ . $Al_2O_3$ . 2.9 $SiO_2$ . 5.3 $H_2O$, 0.2% FA-EO-CME. |
| Concentration of the suspension: | 9.1% solids having the above composition. |
| Ca-sequestering power: | 98 mg CaO/gm AS. |

Comparison Test with Reference to Examples A1 to A12

| | |
|---|---|
| Precipitation: | As in Example A1, except that no surfactant was used. |
| Composition of the dried precipitation product: | 1.2 $Na_2O$ . $Al_2O_3$ . 2.8 $SiO_2$ . 5.3 $H_2O$, 0.00% surfactant. |
| Concentration of the suspension: | 9.1% solids having the above composition. |
| Ca-sequestering power: | 90 mg CaO/gm AS. |

When the products according to Examples A1 to A12 were compared with the product of the comparative test, with reference to the stability of the aqueous suspensions, this comparison shows that the sedimentation rate in the product of the comparative test is considerably higher, which means that the products according to the invention can be held for a longer period of time without depositing sediment. Furthermore, the products according to the invention show a higher cation exchange capacity than the products without the addition of surfactants.

EXAMPLE A13

| | |
|---|---|
| Precipitation: | 0.1 gm of ABS in the form of a technical 20% solution and 9.05 gm of a 25% aqueous solution of $Na_2O$ . 8 $SiO_2$ dissolved in 400 ml of deionized water were reacted with a solution of 5.50 gm of sodium aluminate (41% $Na_2O$; 54% $Al_2O_3$) in 80 ml of water. |
| Composition of the dried precipitation product: | 1.2 $Na_2O$ . $Al_2O_3$ . 2.7 $SiO_2$ . 6.4 $H_2O$, 0.7% ABS. |
| Concentration of the suspension: | About 2% solids having the above composition. |
| Ca-sequestering | |

-continued power: 105 mg CaO/gm AS.

EXAMPLE A14

| | |
|---|---|
| Precipitation: | 4 gm of ABS in the form of a 20% technical solution were dissolved in 10 ml of deionized water and mixed with 361.6 gm of a 25% solution of $Na_2O \cdot 8 SiO_2$. To this solution, 109.6 gm of solid sodium aluminate (41% $Na_2O$; 54% $Al_2O_3$) were added in proportions while stirring vigorously. |
| Composition of the dried precipitation product: | $1.2 Na_2O \cdot Al_2O_3 \cdot 2.7 SiO_2 \cdot 5.1 H_2O$, 2% ABS. |
| Concentration of the suspension: | 37.2% solids having the above composition. |
| Ca-sequestering power: | 98 mg CaO/gm AS. |

EXAMPLE A15

| | |
|---|---|
| Precipitation: | 1.0 gm of ABS in the form of a 20% technical solution and 32.6 gm of sodium aluminate (41% $Na_2O$; 54% $Al_2O_3$) were dissolved in 300 ml of deionized water. The solution was treated with 70 gm of a 25% $Na_2O \cdot 8 SiO_2$ solution in 100 ml of water. |
| Composition of the dried precipitation product: | $1.1 Na_2O \cdot Al_2O_3 \cdot 1.6 SiO_2 \cdot 4.8 H_2O$, 1.6% ABS. |
| Concentration of the suspension: | 9.2% solids having the above composition. |
| Ca-sequestering power: | 115 mg CaO/gm AS. |

EXAMPLE A16

| | |
|---|---|
| Precipitation: | 1.0 gm of ABS in the form of a 20% technical solution and 18.8 gm of sodium aluminate (41% $Na_2O$; 54% $Al_2O_3$) were dissolved in 300 ml of deionized water. This solution was treated with a solution of 124.5 gm of a 25% solution of $Na_2O \cdot 8 SiO_2$ in 100 ml of water. |
| Composition of the dried precipitation product: | $1.5 Na_2O \cdot Al_2O_3 \cdot 3.8 SiO_2 \cdot 5.2 H_2O$, 1.7% ABS. |
| Concentration of the suspension: | 9.9% solids having the above composition. |
| Ca-sequestering power: | 116 mg CaO/gm AS. |

EXAMPLE A17

| | |
|---|---|
| Precipitation: | 0.1 gm of ABS in the form of a 50% technical paste and 148 gm of a 35% aqueous solution of $Na_2O \cdot 3.46 SiO_2$ dissolved in 637 gm deionized water were treated with a solution of 54.8 gm of sodium aluminate (41% $Na_2O$; 54% $Al_2O_3$) in 160 gm of water. |
| Composition of the dried precipitation product: | $1.25 Na_2O \cdot Al_2O_3 \cdot 2.75 SiO_2 \cdot 4 H_2O$, 0.032% ABS. |
| Concentration of the suspension: | About 10% solids having the above composition. |
| Ca-sequestering power: | 100 mg CaO/gm As. |

In order that the low content of surfactant in the precipitation product according to Example A17 could be determined with sufficient accuracy, the amount of substance obtained in three batches was extracted with alcohol, and the solution thus obtained was concentrated and titrated as described above.

EXAMPLE K1

| | |
|---|---|
| Precipitation: | 0.5 gm of CTMA in the form of a 25% technical solution and 90.4 gm of a 25% $Na_2O \cdot 8 SiO_2$ solution were dissolved in 300 ml deionized water. This solution was treated with a solution of 27.4 gm of sodium aluminate (41% $Na_2O$; 54% $Al_2O_3$) in 80 ml of water. |
| Composition of the dried precipitation product: | $1.2 Na_2O \cdot Al_2O_3 \cdot 2.9 SiO_2 \cdot 6.4 H_2O$, 0.9% CTMA |
| Concentration of the suspension: | 9.4% solids having the above composition. |
| Ca-sequestering power: | 109 mg CaO/gm AS. |

EXAMPLE K2

| | |
|---|---|
| Precipitation: | As in Example K1, except that 1.0 gm of CTMA was used. |
| Composition of the dried precipitation product: | $1.2 Na_2O \cdot Al_2O_3 \cdot 2.8 SiO_2 \cdot 6.8 H_2O$, 1.9% CTMA. |
| Concentration of the suspension: | 9.6% solids having the above composition. |
| Ca-sequestering power: | 113 mg CaO/gm AS. |

EXAMPLE K3

| | |
|---|---|
| Precipitation: | As in Example K1, except that 2.5 gm of CTMA were used. |
| Composition of the dried precipitation product: | $1.1 Na_2O \cdot Al_2O_3 \cdot 3.1 SiO_2 \cdot 5.5 H_2O$, 4.6% CTMA. |
| Concentration of the suspension: | 9.5% solids having the above composition. |
| Ca-sequestering power: | 121 mg CaO/gm AS. |

EXAMPLE K4

| | |
|---|---|
| Precipitation: | As in Example K1, except that 5 gm of CTMA were used. |
| Composition of the dried precipitation product: | $1.3 Na_2O \cdot Al_2O_3 \cdot 3.2 SiO_2 \cdot 5.4 H_2O$, 6.3% CTMA. |
| Concentration of the suspension: | 9.9% solids having the above composition. |
| Ca-sequestering power: | 114 mg CaO/gm AS. |

EXAMPLE K5

| | |
|---|---|
| Precipitation: | As in Example K1, except that 10 gm of CTMA were used. |
| Composition of the dried precipitation product: | $1.2 Na_2O \cdot Al_2O_3 \cdot 2.9 SiO_2 \cdot 4.8 H_2O$, 15.3% CTMA. |
| Concentration of the suspension: | 10.8% solids having the above composition. |
| Ca-sequestering power: | 128 mg CaO/gm AS. |

EXAMPLE K6

| | |
|---|---|
| Precipitation: | As in Example K1, except that 50 gm of CTMA were used. |
| Composition of the dried precipitation product: | $1.2 Na_2O \cdot Al_2O_3 \cdot 2.8 SiO_2 \cdot 5.7 H_2O$, 14.3% CTMA. |

| | -continued |
|---|---|
| Concentration of the suspension: | 10.4% solids having the above composition. |
| Ca-sequestering power: | 122 mg CaO/gm AS. |

EXAMPLE K7

| Precipitation: | As in Example K1, except that 1 gm of LTMA was used. |
|---|---|
| Composition of the dried precipitation product: | 1.3 $Na_2O \cdot Al_2O_3 \cdot 2.9 SiO_2 \cdot 5.3 H_2O$, 1.4% LTMA. |
| Concentration of the suspension: | 9.2% solids having the above composition. |
| Ca-sequestering power: | 115 mg CaO/gm AS. |

EXAMPLE K8

| Precipitation: | As in Example K1, except that 1 gm of LPYC was used. |
|---|---|
| Composition of the dried precipitation product: | 1.1 $Na_2O \cdot Al_2O_3 \cdot 2.8 SiO_2 \cdot 6.5 H_2O$, 1.2% LYPC. |
| Concentration of the suspension: | 9.5% solids having the above composition. |
| Ca-sequestering power: | 107 mg CaO/gm AS. |

| Precipitation: | As in Example K1, except that no surfactant was added. |
|---|---|
| Composition of the dried precipitation product: | 1.2 $Na_2O \cdot Al_2O_3 \cdot 2.8 SiO_2 \cdot 5.3 H_2O$, 0.00% surfactant |
| Concentration of the suspension: | 9.1% solids having the above composition. |
| Ca-sequestering power: | 90 mg CaO/gm AS. |

When the suspensions prepared according to Examples K1 to K8 were compared with the suspension of the comparative test, this comparison shows that the latter suspension has a considerably higher sedimentation rate, which means that the suspensions according to the invention can be stored for a longer period of time without depositing sediment.

EXAMPLE K9

| Precipitation: | 0.1 gm of CTMA in the form of a 25% technical solution and 9.05 gm of a 25% $NaO_2 \cdot 8 SiO_2$ solution were dissolved in 400 ml deionized water. This solution was treated with a solution of 5.50 gm of sodium aluminate (41% $NaO_2$; 54% $Al_2O_3$) in 80 ml of water. |
|---|---|
| Composition of the dried precipitation product: | 1.1 $Na_2O \cdot Al_2O_3 \cdot 2.7 SiO_2 \cdot 5.6 H_2O$, about 2% of CTMA |
| Concentration of the suspension: | 1.8% solids having the above composition. |
| Ca-sequestering power: | 116 mg CaO/gm AS. |

EXAMPLE K10

| Precipitation: | 4 gm of CTMA in the form of a 25% technical solution were dissolved in 10 ml of deionized water and mixed with 361.6 gm of a 25% $Na_2O \cdot 8 SiO_2$ solution. 109.6 gm of solid sodium aluminate (41% $Na_2O$; 54% $Al_2O_3$) were added in portions to this solution while stirring |
|---|---|

| | -continued |
|---|---|
| | vigorously. |
| Composition of the dried precipitation product: | 1.3 $Na_2O \cdot Al_2O_3 \cdot 3.3 SiO_2 \cdot 7.4 H_2O$, 1.9% CTMA |
| Concentration of the suspension: | 38.3% solids having the above composition. |
| Ca-sequestering power: | 98 mg CaO/gm AS. |

EXAMPLE K11

| Precipitation: | 1.0 gm of CTMA in the form of a 25% technical solution and 32.6 gm of sodium aluminate (41% $Na_2O$; 54% $Al_2O_3$) were dissolved in 300 ml deionized water. This solution was treated with a solution of 70 gm of a 25% $Na_2O \cdot 8 SiO_2$ solution in 100 ml of water. |
|---|---|
| Composition of the dried precipitation product: | 1.0 $Na_2O \cdot Al_2O_3 \cdot 1.6 SiO_2 \cdot 5.3 H_2O$, 1.5% CTMA. |
| Concentration of the suspension: | 9.2% solids having the above composition. |
| Ca-sequestering power: | 115 mg CaO/gm AS. |

EXAMPLE K 12

| Precipitation: | 1.0 gm of CTMA in the form of a 25% technical solution and 18.8 gm of sodium aluminate (41% $Na_2O$; 54% $Al_2O_3$) were dissolved in 300 ml of deionized water. This solution was treated with a solution of 124.5 gm of 25% $Na_2O \cdot 8 SiO_2$ solution in 100 ml of water. |
|---|---|
| Composition of the dried precipitation product: | 1.5 $Na_2O \cdot Al_2O_3 \cdot 3.8 SiO_2 \cdot 5.2 H_2O$, 1.9% CTMA. |
| Concentration of the suspension: | 9.7% solids having the above composition. |
| Ca-sequestering power: | 108 mg CaO/gm AS. |

EXAMPLE K 13

| Precipitation: | As in Example K1, except that 1.0 gm of LDBD was used. |
|---|---|
| Composition of the dried precipitation product: | 1.2 $Na_2O \cdot Al_2O_3 \cdot 2.8 SiO_2 \cdot 5.4 H_2O$, 1.8% LDBD |
| Concentration of the suspension: | 9.7% solids having the above composition. |
| Ca-sequestering power: | 110 mg CaO/gm AS. |

EXAMPLE K14

| Precipitation: | As in Example K1, except that 1.0 gm of LBDM was used. |
|---|---|
| Composition of the dried precipitation product: | 1.2 $Na_2O \cdot Al_2O_3 \cdot .7 SiO_2 \cdot 5.9 H_2O$, 1.7% LBDM. |
| Concentration of the suspension: | 9.5% solids having the above composition. |
| Ca-sequestering power: | 116 mg CaO/gm AS. |

EXAMPLE K15

| Precipitation: | As in Example K1, except that 1.0 gm of TDMA was used. |
|---|---|
| Composition of the dried precipitation product: | 1.2 $Na_2O \cdot Al_2O_3 \cdot 2.8 SiO_2 \cdot 5.7 H_2O$, 1.7% TDMA. |
| Concentration of | |

-continued

| | |
|---|---|
| the suspension: | 9.7% solids having the above composition. |
| Ca-sequestering power: | 114 mg CaO/gm AS. |

EXAMPLE K16

| | |
|---|---|
| Precipitation: | As in Example K1, except that 1.0 gm of CTMB was used. |
| Composition of the dried precipitation product: | 1.1 $Na_2O \cdot Al_2O_3 \cdot 2.9\ SiO_2 \cdot 4.8\ H_2O$, 1.9% CTMB. |
| Concentration of the suspension: | 9.9% solids having the above composition. |
| Ca-sequestering power: | 108 mg CaO/gm AS. |

EXAMPLE K 17

| | |
|---|---|
| Precipitation: | As in Example K1, except that 5 gm of N,N-didodecylamine were used in place of the CTMA. |
| Composition of the dried precipitation product: | 1.37 $Na_2O \cdot Al_2O_3 \cdot 2.7\ SiO_2 \cdot 4.18\ H_2O$ + 7.5% N,N-didodecylamine. |
| Concentration of the suspension: | about 10% solids having the above composition. |
| Ca-sequestering power: | 115 mg CaO/gm AS. |

EXAMPLE K 18

| | |
|---|---|
| Precipitation: | As in Example K1, except that 5 mg of N-dodecyl-N,N-dimethylamine were used in place of the CTMA. |
| Composition of the dried precipitation product: | 1.32 $Na_2O \cdot Al_2O_3 \cdot 2.57\ SiO_2 \cdot 4.52\ H_2O$ + 1.6% of N-dodecyl-N,N-dimethylamine. |
| Concentration of the suspension: | About 10% solids having the above composition. |
| Ca-sequestering power: | 115 mg CaO/gm AS. |

EXAMPLE K19

| | |
|---|---|
| Precipitation | As in Example K1, except that 5 gm of octylamine were used in place of the CTMA. |
| Composition of the dried precipitation product: | 1.01 $Na_2O \cdot Al_2O_3 \cdot 2.39\ SiO_2 \cdot 3.87\ H_2O$ + 3.1% octylamine. |
| Concentration of the suspension: | About 10% solids having the above composition |
| Ca-sequestering power: | 110 mg CaO/gm AS. |

EXAMPLE K20

| | |
|---|---|
| Precipitation: | As in Example K1, except that 5 gm of a tertiary amine group containing $C_{12-18}$ coconut oil fatty acids-polydiethanol-amide (obtained as the condensation product of 1 mol of coconut oil fatty acids and 2 mols of diethanolamine) were used. |
| Composition of the dried precipitation product: | 1.36 $Na_2O \cdot Al_2O_3 \cdot 2.38\ SiO_2 \cdot 3.78\ H_2O$ + 3.4% coconut fatty acid-polydiethanolamide. |
| Concentration of the suspension: | About 10% solids having the above composition. |
| Ca-sequestering power: | 120 mg CaO/gm As. |

EXAMPLE K21

| | |
|---|---|
| Precipitation: | 50 mg of CTMA in the form of a 25% technical solution and 148 gm of a 35% aqueous solution of $Na_2O \cdot 3.46\ SiO_2$ were dissolved in 637 gm of deionized water. This solution was treated with a solution of 54.8 gm of sodium aluminate (41% $Na_2O$; 54% $Al_2O_3$) in 160 gm of water. |
| Composition of the dried precipitation product: | 1.25 $Na_2O \cdot Al_2O_3 \cdot 2.75\ SiO_2 \cdot 4\ H_2O$, 0.02% CTMA |
| Concentration of the suspension: | About 10% solids having the above composition. |
| Ca-sequestering power: | 100 mg CaO/gm AS. |

In order that the low content of surfactant in the precipitation product of Example K 21 could be determined with sufficient accuracy, the quantity of substance obtained in three batches was extracted with alcohol, and the solution thus obtained was concentrated and tested as described above.

EXAMPLE Z1

| | |
|---|---|
| Precipitation: | As in Example A1, except that 1 gm of a betaine having the formula $$C_{12}H_{25}-\underset{\underset{CH_3}{\diagup}\ \underset{CH_3}{\diagdown}}{N^{\oplus}}-CH_2-COO^{\ominus}$$ was added to the sodium silicate solution in place of the ABS. |
| Composition of the dried precipitation product: | 1.3 $Na_2O \cdot Al_2O_3 \cdot 2.7\ SiO_2 \cdot 5.6\ H_2O$ + 0.05% betaine. |
| Concentration of the suspension: | 9.4% solids having the above composition. |
| Ca-sequestering power: | 103 mg CaO/gm As. |

EXAMPLE Z2

| | |
|---|---|
| Precipitation: | As in Example Z1, except that 5 gm of the betaine were used. |
| Composition of the dried precipitation product: | 1.2 $Na_2O \cdot Al_2O_3 \cdot 2.8\ SiO_2 \cdot 4.9\ H_2O$ + 0.06% betaine. |
| Concentration of the suspension: | 9.5% solids having the above composition. |
| Ca-sequestering power: | 105 mg CaO/gm AS. |

EXAMPLE Z3

| | |
|---|---|
| Precipitation: | As in Example Z1, except that 25.0 gm of the betaine were used. |
| Composition of the dried precipitation product: | 1.3 $Na_2O \cdot Al_2O_3 \cdot 2.9\ SiO_2 \cdot 5.1\ H_2O$ + 0.1% betaine. |
| Concentration of the suspension: | 9.3% solids having the above composition. |
| Ca-sequestering power | 116 mg CaO/gm AS. |

EXAMPLE Z4

| | |
|---|---|
| Precipitation: | As in Example Z1, except that 1 gm of a betaine having the formula $$R-\underset{\underset{CH_3}{\diagup}\ \underset{CH_2\text{-}Ph}{\diagdown}}{N^{\oplus}}-CH_2-COO^{\ominus}$$ wherein R is coconut alkyl ($C_{12}$ to $C_{16}$-alkyl, average chain length $C_{13.5}$) was |

-continued

| | |
|---|---|
| Composition of the dried precipitation product: | $1.3\ Na_2O \cdot Al_2O_3 \cdot 2.8\ SiO_2 \cdot 5.2H_2O\ +$ 0.05% betaine. |
| Concentration of the suspension: | 9.4% solids having the above composition. |
| Ca-sequestering power: | 106 mg CaO/gm AS. |

EXAMPLE Z5

| | |
|---|---|
| Precipitation: | As in Example Z1, except that 1 gm of a betaine having the formula |

$$\begin{array}{c} CH_2-CH_2OH \\ | \\ R-{}^{\oplus}N-CH_2-COO^{\ominus} \\ | \\ CH_2-CH_2-O-CH_2-CH_2-OH \end{array}$$

wherein R is coconut alkyl, was used.

| | |
|---|---|
| Composition of the dried precipitation product: | $1.3\ Na_2O \cdot Al_2O_3 \cdot 2.7\ SiO_2 \cdot 5.4\ H_2O\ +$ 0.05% betaine. |
| Concentration of the suspension: | 9.4% solids having the above composition. |
| Ca-sequestering power: | 107 mg CaO/gm AS. |

EXAMPLE Z6

| | |
|---|---|
| Precipitation: | As in Example Z1, except that 1 gm of a betaine having the formula |

$$C_{12}H_{25}-\underset{\underset{\underset{CH_2}{\diagdown N \diagup}}{\overset{\|}{C}}}{\overset{\overset{CH_2-CH_2OH}{|}}{\underset{}{}}}-\overset{}{\underset{}{^{\oplus}N-CH_2-COO^{\ominus}}}$$

was used.

| | |
|---|---|
| Composition of the dried precipitation product: | $1.3\ Na_2O \cdot Al_2O_3 \cdot 2.8\ SiO_2 \cdot 5.1\ H_2O\ +$ 0.05% betaine. |
| Concentration of the suspension: | 9.5% solids having the above composition. |
| Ca-sequestering power: | 110 mg CaO/gm AS. |

EXAMPLE Z 7

| | |
|---|---|
| Precipitation: | As in Example Z1, except that 1 gm of a sulfobetaine having the formula |

$$C_{12}H_{25}-\underset{CH_3\quad CH_3}{\overset{}{N^{\oplus}}}-CH_2-CH_2-CH_2-SO_3^{\ominus}$$

was used.

| | |
|---|---|
| Composition of the dried precipitation product: | $1.2\ Na_2O \cdot Al_2O_3 \cdot 2.8\ SiO_2 \cdot 5.1\ H_2O\ +$ 0.05% sulfobetaine. |
| Concentration of the suspension: | 9.5% solids having the above composition. |
| Ca-sequestering power: | 107 mg CaO/gm AS. |

EXAMPLE Z8

| | |
|---|---|
| Precipitation: | As in Example Z1 except that 1 gm of a sulfobetaine having the formula |

$$C_{16}H_{33}-\underset{CH_3\quad CH_3}{\overset{}{N^{\oplus}}}-CH_2-CHOH-CH_2O-SO_3^{\ominus}$$

was used.

| | |
|---|---|
| Composition of the dried precipitation product: | $1.3\ Na_2O \cdot Al_2O_3 \cdot 2.7\ SiO_2 \cdot 5.4\ H_2O\ +$ 0.05% sulfobetaine. |
| Concentration of the suspension: | 9.4% solids having the above composition. |
| Ca-sequestering power: | 106 mg CaO/gm AS. |

EXAMPLE Z9

| | |
|---|---|
| Precipitation: | 50 mg of the betaine according to Example Z1 in the form of a 30% technical solution and 148 gm of a 35% aqueous solution of $Na_2O \cdot 3.46\ SiO_2$ were dissolved in 637 gm of deionized water. This solution was treated with a solution of 54.8 gm of sodium aluminate (41% $Na_2O$; 54% $Al_2O_3$) in 160 gm of water. |
| Composition of the dried precipitation product: | $1.25\ Na_2O \cdot Al_2O_3 \cdot 2.75\ SiO_2 \cdot 4\ H_2O\ +$ 0.05% betaine. |
| Concentration of the suspension: | About 10% solids having the above composition. |
| Ca-sequestering power: | 100 mg CaO/gm AS. |

In order that the very low betaine content in the precipitation products, especially in that of Example Z9 could be determined with sufficient exactness, the quantity of substance obtained in three batches was extracted with alcohol and freed from inorganic constituents by passage through ion exchange columns. The filtrate was evaporated.

| Comparative Test with Reference to Examples Z1 to Z9 | |
|---|---|
| Precipitation: | As in Example A1, without the addition of the zwitterionic surfactant. |
| Composition of the dried precipitation product: | $1.2\ Na_2O \cdot Al_2O_3 \cdot 2.8\ SiO_2 \cdot 5.3\ H_2O$ 0.00% surfactant. |
| Concentration of the suspension: | 9.1% solids having the above composition. |
| Ca-sequestering power: | 90 mg CaO/gm AS. |

A comparison with the suspension prepared according to Examples Z1 to Z9 shows that in the comparative test conducted at 25° C., it takes only one hour until about 95% of the solids settle out at the bottom of the measuring vessel whereas even after 24 hours, less than 10% of the suspended matter of the suspensions prepared according to the invention had settled out at the bottom.

As the Examples show, the composition of the products according to the invention lies in the range of 0.9 to 1.5 $Cat_{2/n}O \cdot Al_2O_3 \cdot 1.3$ to 4 $SiO_2$, where the water content is not taken into account. The surfactant content of the products dried in the above-described manner lies between 0.01% to 35%, preferably 0.1% to 20% by weight so far as anionic or cationic surface-active compounds are concerned. Amounts of 0.01% to 0.1% by weight of zwitterionic surface-active compounds were found when the above-described method of determination was used.

One can vary the process described in the Examples by pouring both solutions simultaneously into the reaction vessel.

In the presence or surfactants resistant to hardness the crystallizability of the sodium aluminosilicates is less than that of the sodium aluminosilicates prepared in the usual manner, i.e., in the absence of surfactants. Therefore, the products prepared according to the directions given in the Examples remain longer or sometimes permanently in an X-ray amorphous state.

EXAMPLES OF WASHING PERFORMANCE

The following aluminosilicates were used:

(A) An amorphous aluminosilicate according to the invention. (This aluminosilicate contains 2.9% by weight of cationic surfactant within its structural framework.)

(B) A conventional amorphous aluminosilicate. (This aluminosilicate contains 3.1% by weight of cationic surfactant adsorbed onto its surface.)

PREPARATION OF THE ALUMINOSILICATES A AND B (A) 12 gm of hexadecyl-trimethylammonium chloride (25% by weight aqueous solution) were diluted with 638 gm of deionized water. Then, 148 gm of sodium silicate solution (35% by weight, molar ratio $SiO_2/Na_2O = 3.4$) were added while stirring. Following this addition, a freshly prepared solution of 54.8 gm of sodium aluminate ($Na_2O/Al_2O_3 = 1.2$) dissolved in 160 gm of deionized water was added while continuing stirring. A suspension of the amorphous surfactant-modified sodium aluminosilicate was formed.

After three hours of continued stirring, the precipitate was separated by suction filtration, washed four times with 50 ml of deionized water and dried at 70° C. for 24 hours. The dried product had the following composition:

$$0.95\ Na_2O \cdot Al_2O_3 \cdot 2.4\ SiO_2 \cdot 4.4\ H_2O$$

Surfactant content = 2.9% by weight.

(B) 148 gm of sodium silicate solution (same as under A) were diluted with 637 gm of deionized water. Then while stirring, 54.8 gm of sodium aluminate (same as under A) dissolved in 160 gm of deionized water were added. The formed suspension of the amorphous sodium aluminosilicate was stirred for three hours. Then, the precipitate was separated by suction filtration, washed four times with 50 ml of deionized water and dried at 70° C. for 24 hours.

100 gm of the dried amorphous sodium aluminosilicate were suspended in a solution of 20 gm of hexadecyl trimethylammonium chloride (25% by weight aqueous solution) in 180 gm of deionized water. After stirring for 3 hours, the solids were separated by suction filtration and dried for 24 hours at 70° C.

The dried product had the following composition:

$$0.95\ Na_2O \cdot Al_2O_3 \cdot 2.5\ SiO_2 \cdot 4.5\ H_2O$$

Surfactant content = 3.1% by weight.

(The difference of the surfactant content of 0.2% by weight between products A and B was believed to be immaterial.)

The washing performance of products A and B, respectively, was tested in the following manner:

The sodium aluminosilicate was added to the wash liquor at a dosage level of 2.4 gm of active substance per liter in the presence of 7 gm per liter of the following liquid laundry detergent formulations:

| Formulation I | Percent by Weight |
| --- | --- |
| Alkyl benzene sulfonate, sodium salt | 6.4 |
| The condensation product of a hydrogenated tallow alcohol with 5 mols of ethylene oxide per mol of alcohol | 2.2 |
| Soap | 3.4 |

| Formulation I | Percent by Weight |
| --- | --- |
| Sodium silicate | 3.0 |
| Sodium perborate | 26.5 |
| Magnesium silicate | 2.0 |
| Sodium tripolyphosphate | 3.0 |
| Sodium citrate | 3.0 |
| Sodium sulfate | 4.0 |
| EDTA | 0.2 |
| Residue water | up to 100 |

FORMULATION II

Same as Formulation I, but the alkyl benzene sulfonate was replaced by the condensation product of a hydrogenated tallow alcohol with 14 mols of ethylene oxide per mol of the alcohol.

The tests were carried out in the Launderometer ® at a ratio of water/textile equal to 12:1, using water of 16° d hardness at 60° C. and a duration of 15 minutes. All tests were carried out with both formulations using standardized soiled textiles (unfinished cotton, resin finished cotton, polyester/cotton).

The experimental results are summarized in Table 1.

TABLE 1

| Product | Remission Data Obtained | | | | | |
| --- | --- | --- | --- | --- | --- | --- |
|  | Unfinished Cotton | | Resin Finished Cotton | | Polyester Cotton | |
|  | I | II | I | II | I | II |
| A Invention | 60 | 62 | 68 | 76 | 53 | 59 |
| B Non-invention | 54 | 64 | 63.5 | 72 | 49 | 57 |

The results obtained clearly show the superiority of the product according to the invention. These results show a better washing performance of the products according to the invention as compared with dried aluminosilicates post-treated with an aqueous solution of surfactant having the same or even a slightly higher amount of surfactant adsorbed onto the surface of the aluminosilicate particles.

EXAMPLE TO RELEASE OF SURFACTANT

Products C and D were employed, which were prepared similarly as Products A and B of the previous example.

(C) An amorphous aluminosilicate according to the invention containing 4.7% by weight of cationic surfactant within its structural framework.

(D) A conventional amorphous aluminosilicate containing 2.8% by weight of cationic surfactant adsorbed onto its surface.

Two-gram samples of the products were treated at room temperature with 100 ml of the following liquids for periods of one hour:

(a) distilled water (b) water of 16° d (German hardness degrees)

(c) water of 16° d, additionally containing 0.1 mol of $Na_2SO_4$ per liter.

After treatment, the mother liquor was separated by suction filtration and the cationic surfactant content of the mother liquor was determined by reverse Epton-titration. Table 2 shows the cationic surfactant contents observed in the various experiments.

TABLE 2

|  |  |  | Reverse Epton-Titration mg Cationic Surfactant | |
| --- | --- | --- | --- | --- |
| a) | Distilled water | C | 5.1 | (invention) |
|  |  | D | 6.4 | (non-invention) |
| b) | 16° d water | C | 6.4 | (invention) |
|  |  | D | 5.1 | (non-invention) |
| c) | 16° d water + 0.1 mol/1 Na$_2$SO$_4$ | C | 3.8 | (invention) |
|  |  | D | 2.6 | (non-invention) |

The results show that increasing the ionic content of the treatment solution strongly favors the release of the cationic surfactant from the aluminosilicates of the invention relative to the release of cationic surfactants, which have been adsorbed onto previously made and dried aluminosilicates.

The ratio cationic surfactant released by C divided by the cationic surfactant released by D has the following trend:

| a) | 5.1:6.4 | b) | 6.4:5.1 | c) | 3.8:2.6 |
| --- | --- | --- | --- | --- | --- |
|  | 0.8 |  | 1.25 |  | 1.46 |

We believe that in the case of the aluminosilicates of the invention, the cationic surfactants occupy sites within the structural frame, which can also be occupied by sodium ions. Therefore, there will be a competition between cationic surfactants and sodium ions for these sites. A reoccupation of these sites by the surfactant is less likely if competing sodium ions are around. Therefore, a relative increase in the rate of surfactant release is observed in the case of aluminosilicates of the invention in the presence of sodium ions.

The preceding specific embodiments are illustrative of the practice of the invention. It is to be understood, however, that other expedients known to those skilled in the art, or disclosed herein, may be employed without departing from the spirit of the invention and the scope of the appended claims.

We claim:

1. Cation-exchanging, water-insoluble, amorphous aluminosilicates containing at least 3 mols of bound water for every mol of Al$_2$O$_3$ and at least 0.01% by weight of a cationic surface-active compound active in the presence of water hardness formers, and having for every mol of Al$_2$O$_3$, from 0.7 to 1.5 mols of Cat$_2$O, where Cat is a cation selected from the group consisting of sodium, potassium and lithium, and from 0.8 to 6 mols of SiO$_2$, said aluminosilicates having a calcium sequestering power of from 50 to 200 mg CaO/gm of anhydrous active substance when measured at 50° C. by the Calcium Binding Power Test Method set out in the specification and a particle size of less than 30 $\mu$, and being produced by the precipitation of said aluminosilicate in an aqueous solution, wherein said reaction is conducted in the presence of an aqueous solution of said surface-active compound.

2. The aluminosilicate of claim 1 wherein Cat is a sodium cation.

3. The aluminosilicates of claim 1 containing from 3 to 10 mols of bound water per mol of Al$_2$O$_3$.

4. The aluminosilicates of claim 1 containing from 0.9 to 1.5 mols of Cat$_2$O.

5. The aluminosilicates of claim 1 containing from 1.3 to 4.0 mols of SiO$_2$.

6. The aluminosilicates of claim 1 containing from 0.01% to 50% by weight, based on the total weight, of said cationic surface-active compound.

7. The aluminosilicates of claim 1 containing from 0.1% to 35% by weight, based on the total weight, of said cationic surface-active compound.

8. The aluminosilicates of claim 1 having a particle size of less than 8 $\mu$.

9. The aluminosilicates of claim 1 wherein said cationic surface-active compound is present in an amount of from 0.1% to 20% by weight, based on the total weight.

10. The aluminosilicates of claim 1 having a calcium sequestering power of from 80 to 160 mg of CaO per gram of anhydrous active substance, when measured at 50° C. by the Calcium Binding Power Test Method set out in the specification.

11. Aqueous suspensions of the aluminosilicates of claim 1 containing from 2% to 50% by weight of said aluminosilicates, said weight based on a product having been dried at 80° C. for at least three hours at a pressure of 100 mm of Hg.

12. Suspensions according to claim 11, characterized in that the aqueous phase essentially dissolves and contains only said cationic surface-active compounds active in the presence of water hardness formers.

13. The process for the preparation of amorphous aluminosilicates by reacting water-soluble aluminates with water-soluble silicates in the presence of water and recovering water-insoluble amorphous aluminosilicates, where said water-soluble aluminates and silicates have cations selected from the group consisting of sodium, potassium and lithium and the amounts employed are selected so that the water-soluble amorphous aluminosilicates have for every mol of Al$_2$O$_3$, from 0.7 to 1.5 mols of Cat$_2$O where Cat represents said cation, and from 0.8 to 6 mols of SiO$_2$, said amorphous aluminosilicate containing at least 3 mols of bound water for every mol of Al$_2$O$_3$ and having a calcium sequestering power of from 50 to 200 mg CaO/gm of anhydrous active substance, when measured at 50° C. by the Calcium Binding Power Test Method set out in the specification, and a particle size of less than 30 $\mu$, the improvement consisting of conducting said reaction in the presence of an aqueous solution of at least 0.01% by weight, based on the weight of said aluminosilicates of a cationic surface-active compound active in the presence of water hardness formers.

14. The process of claim 13 wherein said cationic surface-active compounds and said water-soluble silicates are dissolved in said water and said water-soluble aluminates are added thereto.

* * * * *